United States Patent
Polunin et al.

(10) Patent No.: US 8,793,489 B2
(45) Date of Patent: Jul. 29, 2014

(54) METHOD AND SYSTEM FOR CONTROLLING DATA ACCESS TO ORGANIZATIONAL DATA MAINTAINED IN HIERARCHICAL

(75) Inventors: Roman Polunin, Sausalito, CA (US); Bogdan Cirlig, Campbell, CA (US); Amit Bansal, Sausalito, CA (US)

(73) Assignee: HumanConcepts, LLC, Sausalito, CA (US)

( * ) Notice: Subject to any disclaimer, the term of this patent is extended or adjusted under 35 U.S.C. 154(b) by 0 days.

(21) Appl. No.: 13/410,157

(22) Filed: Mar. 1, 2012

(65) Prior Publication Data
US 2013/0232539 A1    Sep. 5, 2013

(51) Int. Cl.
| | |
|---|---|
| *H04L 12/22* | (2006.01) |
| *G06Q 10/10* | (2012.01) |
| *G06Q 10/04* | (2012.01) |
| *H04L 29/02* | (2006.01) |

(52) U.S. Cl.
CPC ............ *G06Q 10/105* (2013.01); *G06Q 10/047* (2013.01); *G06Q 10/101* (2013.01)
USPC .............................. 713/166; 726/29; 726/30

(58) Field of Classification Search
CPC combination set(s) only.
See application file for complete search history.

(56) References Cited

U.S. PATENT DOCUMENTS

| | | | |
|---|---|---|---|
| 6,647,388 B2 | 11/2003 | Numao et al. | |
| 7,350,144 B2 | 3/2008 | Burg et al. | |
| 7,487,154 B2 | 2/2009 | Rogers et al. | |
| 7,567,964 B2 | 7/2009 | Brice et al. | |
| 7,801,755 B2 | 9/2010 | Doherty et al. | |
| 2002/0128925 A1 | 9/2002 | Angeles et al. | |
| 2004/0111431 A1 | 6/2004 | Zeller et al. | |
| 2006/0277476 A1 | 12/2006 | Lai et al. | |
| 2008/0034438 A1* | 2/2008 | Mireku ........................... | 726/27 |
| 2008/0147647 A1 | 6/2008 | Reeb et al. | |
| 2008/0300952 A1 | 12/2008 | Couper | |
| 2009/0006427 A1 | 1/2009 | Veeraraghavan et al. | |
| 2010/0070505 A1 | 3/2010 | Kao et al. | |
| 2010/0169143 A1 | 7/2010 | Carr et al. | |
| 2010/0191554 A1 | 7/2010 | Singh et al. | |
| 2010/0299176 A1 | 11/2010 | Mangipudi et al. | |

OTHER PUBLICATIONS

A Model for Role Administration Using Organization Structure. Oh et al. ACM(2002).*
An Access Control Model in a Semantic Data Structure: Case Process Modelling of a Bleaching Line. Kalajainen, Toni. Master Thesis(2007).*
A Role-Based Access Control: A Multi-Dimensional View. Sandhu et al. IEEE(1994).*
"Aspose.Total for .NET and Java," Aspose, May 20, 2011, available at <http://www.aspose.com/community/files/66/corporate/brochures/entry304942.aspx>, retrieved Apr. 2, 2012, 9 pages.

(Continued)

*Primary Examiner* — Venkat Perungavoor
(74) *Attorney, Agent, or Firm* — Dergosits & Noah LLP

(57) ABSTRACT

Embodiments are described for a system and method of controlling access to information in an organization by defining a hierarchical organizational structure of boxes, and security configuration comprising user records, security roles, rules to map users to boxes, and rules to grant roles to users via mapped boxes. Access control is applied in the context of a defined organizational structure using the effective set of access control policies computed in real time per each data access request from any given user.

18 Claims, 13 Drawing Sheets

(56) References Cited

OTHER PUBLICATIONS

"Rhino Overview," Mozilla, Feb. 1, 2012, available at <http://www.mozilla.org/rhino/overview.html>, retrieved Apr. 2, 2012, 4 pages.
"NHibernate Forge," NHibernate, available at < http://nhforge.org/Default.aspx>, retrieved Apr. 4, 2012, 1 page.
"DotNetZip—Zip and Unzip in C#, VB, any .NET language," CodePlex, Jul. 11, 2011, available at < http://dotnetzip.codeplex.com/>, retrieved Apr. 2, 2012, 6 pages.
"Irony—.NET Language Implementation Kit," CodePlex, Oct. 4, 2011, available at <http://irony.codeplex.com/>, retrieved Apr. 3, 2012, 2 pages.
"ReSharper 6," JetBrains, Jun. 30, 2011, available at <http://www.jetbrains.com/resharper/index.html>, retrieved Apr. 3, 2012, 4 pages.
"Expression Blend," Microsoft, 2010, available at <http://www.microsoft.com/expression/products/Blend_Overview.aspx>, retrieved Apr. 3, 2012, 10 pages.
"ILMerge," Microsoft, Nov. 4, 2011, available at <http://www.microsoft.com/download/en/details.aspx?displaylang=en&id=17630>, retrieved Apr. 3, 2012, 2 pages.
De Beijer, Maurice, "Getting started with the .NET RIA Services," Microsoft, available at < http://msdn.microsoft.com/en-us/library/dd776095.aspx>, retrieved Apr. 3, 2012, 11 pages.
Dubray, Jean-Jacques, "Microsoft Introduces .Net RIA Services," InfoQ, Mar. 19, 2009, available at < http://www.infoq.com/news/2009/03/net-ria-services>, retrieved Apr. 3, 2012, 7 pages.
"Developer's Guide to Microsoft Prism," Microsoft, Feb. 2012, available at <http://msdn.microsoft.com/en-us/library/gg406140.aspx>, retrieved Apr. 3, 2012, 6 pages.
"Patterns & Practices—Unity," Microsoft, Oct. 27, 2011, available at <http://unity.codeplex.com/>, retrieved Apr. 3, 2012, 2 pages.
"Get Started with Silverlight," Microsoft, available at <http://www.silverlight.net/>, retrieved Apr. 3, 2012, 2 pages.
Brown, Pete, "Announcing the Release of Silverlight 5!," 10Rem.net, Dec. 9, 2011, available at <http://10rem.net/blog/2011/12/09/announcing-the-release-of-silverlight-5>, retrieved Apr. 3, 2012, 9 pages.
Shaver, Jason R., "Microsoft Silverlight Toolkit," CodePlex, Dec. 19, 2011, available at <http://silverlight.codeplex.com/>, retrieved Apr. 3, 2012, 1 page.
"Generating Files with the TextTransform Utility," Microsoft, Jun. 2010, available at <http://msdn.microsoft.com/en-us/library/bb126245.aspx>, retrieved Apr. 3, 2012, 4 pages.
"Makecert.exe (Certificate Creation Tool)," Microsoft, Apr. 2011, available at <http://msdn.microsoft.com/en-us/library/bfsktky3.aspx>, retrieved Apr. 3, 2012, 7 pages.
"Producing High-Quality Software with Aspect-Oriented Programming," SharpCrafters, Jul. 2011, available at <http://www.sharpcrafters.com/downloads/documentation/Producing%20High-Quality%20Software%20with%20Aspect-Oriented%20Programming.docx>, retrieved Apr. 3, 2012, 18 pages.
"Reactive Extensions," Microsoft, available at <http://msdn.microsoft.com/en-us/library/hh242985(v=vs.103).aspx>, retrieved Apr. 3, 2012, 2 pages.
"Reactive Extensions Jun. 5, 2011 Release Available," Microsoft, Jun. 10, 2011, available at <http://blogs.msdn.com/b/rxteam/archive/2011/06/10/reactive-extensions-6-5-2011-release-available.aspx>, retrieved Apr. 4, 2012, 2 pages.
"StatLight Silverlight Testing Automation Tool," CodePlex, Dec. 20, 2011, available at <http://statlight.codeplex.com>, retrieved Apr. 3, 2012, 2 pages.
Russinovich, Mark, "PsExec v1.98," Microsoft, Apr. 28, 2009, available at <http://technet.microsoft.com/en-us/sysinternals/bb897553>, retrieved Apr. 3, 2012, 3 pages.
"Telerik," Telerik, available at < http://www.telerik.com/>, retrieved Apr. 3, 2012, 2 pages.
Taft, Darryl K., "Telerik Delivers Tools for Microsoft Silverlight, ASP.NET MVC," eWeek.com, Aug. 12, 2009, available at <http://www.eweek.com/c/a/Application-Development/Telerik-Delivers-Tools-for-Microsoft-Silverlight-ASPNET-MVC-382400/>, retrieved Apr. 3, 2012, 3 pages.
"Introducing Castle," CastleProject, available at <http://www.castleproject.org/>, retrieved Apr. 3, 2012, 2 pages.
"Castle Project Documentation," CastleProject, Nov. 2, 2011, available at <http://docs.castleproject.org/>, retrieved Apr. 3, 2012, 2 pages.
"What is Apache log4net," The Apache Software Foundation, Nov. 24, 2011, available at <http://logging.apache.org/log4net/> retrieved Apr. 3, 2012, 1 page.
"Apache Lucene.NET—Index," Feb. 14, 2011, available at <https://cwiki.apache.org/LUCENENET/>, retrieved Apr. 3, 2012, 1 page.
Powell, Aaron, "An Overview of Lucene.Net," LINQ to Fail, Apr. 14 2010, available at <http://www.aaron-powell.com/lucene-net-overview>, retrieved Apr. 3, 2012, 4 pages.
"Luke—Lucene Index Toolbox," Google Project Hosting, 2011, available at <http://code.google.com/p/luke/>, retrieved Apr. 3, 2012, 1 page.
"moq," Google Project Hosting, 2011, available at <http://code.google.com/p/moq/>, retrieved Apr. 3, 2012, 3 pages.
"What Is NUnit?," NUnit.org, Feb. 20, 2012, available at <http://www.nunit.org>, retrieved Apr. 3, 2012, 7 pages.
Eini, Oren, "Ayende @ Rahien rhino mocks," Jun. 1, 2011, available at <http://ayende.com/blog/tags/rhino-mocks>, retrieved Apr. 3, 2012, 20 pages.
"Hibernating Rhinos—Rhino Mocks," Hibernating Rhinos, Oct. 19, 2009, available at <http://hibernatingrhinos.com/open-source/rhino-mocks>, retrieved Apr. 3, 2012, 1 page.
"StructureMap—StructureMap Home Page," Jan. 2009, available at <http://structuremap.net/structuremap/index.html>, retrieved Apr. 3, 2012, 2 pages.
"SQL Server 2005," Microsoft, 2005, available at <http://technet.microsoft.com/en-US/library/ms166352(v=sql.90).aspx>, retrieved Apr. 3, 2012, 4 pages.
"SQL Server 2008," Microsoft, 2008, available at <http://technet.microsoft.com/en-us/library/ms130214(v=sql.100).aspx>, retrieved Apr. 3, 2012, 2 pages.
"Adobe RoboHelp 9 Datasheet," Adobe, 2010, available at <http://www.adobe.com/pdf/pdfs/91030572_rh_9_datasheet_ue.pdf>, retrieved Apr. 3, 2012, 2 pages.
"Microsoft Visual Studio 2010 Ultimate Overview Datasheet," Microsoft, 2010, available at <http://www.microsoft.com/visualstudio/en-us/products/2010-editions/ultimate/overview>, retrieved Apr. 3, 2012, 4 pages.
"Mixpanel Features," Mixpanel, available at <https://mixpanel.com/>, retrieved Apr. 3, 2012, 8 pages.
"Jira Overview," Atlassian, available at <http://www.atlassian.com/software/jira/overview>, retrieved Apr. 3, 2012, 4 pages.
"GreenHopper Overview," Atlassian, available at <http://www.atlassian.com/software/greenhopper/overview#>, retrieved Apr. 3, 2012, 3 pages.
"Team City Features," JetBrains, available at <http://www.jetbrains.com/teamcity/features/index.html>, retrieved Apr. 3, 2012, 6 pages.
"Test Studio Overview," Telerik, available at <http://www.telerik.com/automated-testing-tools/>, retrieved Apr. 3, 2012, 2 pages.
Rathbone, Doug, "Ga Dot Net," Diary of a Ninja, available at <http://www.diaryofaninja.com/projects/details/ga-dot-net>, retrieved Apr. 3, 2012, 8 pages.
Rathbone, Doug, "Release of Google Analytics Dot Net," Diary of a Ninja, Jul. 4, 2010, available at <http://www.diaryofaninja.com/blog/2010/07/04/release-of-google-analytics-dot-net>, retrieved Apr. 2, 2012, 9 pages.
The Zip, GZip, BZip2 and Tar Implementation for .NET, ic#code, May 25, 2010, available at <http://www.icsharpcode.net/OpenSource/SharpZipLib/Default.aspx>, retrieved Apr. 3, 2012.
"Aquire OrgPublisher Premier Brochure," Aquire, Aug. 1, 2011, available at < http://www.aquire.com/resources/dyn/files/575683z3acba765/_fn/OrgPublisher+Premier+Brochure.pdf>, retrieved Apr. 3, 2012, 5 pages.

(56) References Cited

OTHER PUBLICATIONS

"Organizational Management by Nakisa," Nakisa, 2012, available at <http://www.nakisa.com/solutions/solutions-overviews/org-management.htm>, retrieved Apr. 4, 2012, 1 page.

"Talent Management by Nakisa," Nakisa, 2012, available at <http://www.nakisa.com/solutions/solutions-overviews/talent-management.htm>, retrieved Apr. 4, 2012, 1 page.

"Product Overview—org.manager," Ingentis, 2012, available at <http://www.ingentis.com/leaflets/>, retrieved Apr. 4, 2012, 2 pages.

"OrgPlusEnterprise," HumanConcepts, 2011, 2 pages.

"OrgChart Professional," OfficeWork Software, 2012, , available at <http://www.orgchartpro.com/orgchart-professional.aspx>, retrieved Apr. 4, 2012, 2 pages.

\* cited by examiner

700

| CONFIGURATION | EFFECTIVE SET OF POLICIES |
|---|---|
| 1<br>user@org.com<br>Role1: entire chart | Entire chart is available |
| 2<br>user@org.com<br>Role1: entire chart AND filter<br>("Department == Finance") | All boxes in chart where field Department = "Finance" are available |
| 3<br>user@org.com<br>Chart User ID value: login name<br>Role1: subordinates | Principal box: John Doe because WorkEmail field = "user@org.com"<br>Boxes for subordinates of John Doe are available |
| 4<br>user@org.com<br>Chart User ID value: "John Doe"<br>Chart User ID field: "Full Name"<br>Role1: subordinates | Principal box: John Doe because FullName field = "John Doe"<br>Boxes for subordinates of John Doe are available |
| 5<br>user@org.com<br>Chart User ID value: "John Doe"<br>Chart User ID field: "Full Name"<br>Role1: self AND filter<br>("Department == Finance") | Principal box: John Doe because FullName field = "John Doe"<br>Principal boxes of John Doe and his subordinates are available if Department = "Finance" |
| 6<br>user@org.com<br>Chart User ID value: login name<br>Chart User ID field: WorkEmail<br>Role1: self<br>Role Rule: if Position Title = "Accountant II", then grant Role1 | Principal box: John Doe because WorkEmail field matches<br>Role1 is granted to user because one of the principal boxes has Position Title equal to Accountant II<br>Box for John Doe and subordinates of John Doe are available |

FIG. 7

Security Management > Users > Joe Administrator          800

Username: default_user@opus.com          802

☑ User is active

First Name: Joe

Last Name: Administrator

Description: Enter text...

☐ Force user to reset password during the next login

Roles:          804
1. Administrator ⊗

Chart User ID:  SETUP  ▼  123          806

| Authentication | User Data Source | Chart User ID |
|---|---|---|

For each domain, select the field that uniquely identifies an user in the chart

| Domain Name | Chart User ID Field |
|---|---|
| SETUP | Person ID ▼ |

| Records - Domain Mode | Records - Planning Mode | Fields | Features |

Specify which chart boxes this role can access. You can limit access to a range of the chart and/or select a filter. You can also specify which box to set as the starting point for the role.

Chart Range — 1002
- ◉ Top of Chart
- ○ Myself
- ○ Level [ 1 ] Supervisor
- ○ Level [ 1 ]

Starting Point — 1004
- ◉ Top of Chart
- ○ Myself
- ○ Level [ 1 ] Supervisor
- ○ Level [ 1 ]

Filter: — 1006
[ No Filter ▼ ]

Precedence: — 1008
[ Range or Filter ▼ ]

Use this tab to establish what records (i.e., people or boxes) the role can edit in a Plan. You can limit access to a range of the org chart and/or select a filter to determine access.

Chart Range — 1102
- ○ Top of Chart
- ◉ Myself
- ○ Subordinates
- ○ Level [ 1 ] Supervisor
- ○ Level [ 1 ]

Filter: — 1106
[ No Filter ▼ ]

Precedence: — 1108
[ Range or Filter ▼ ]

METHOD AND SYSTEM FOR CONTROLLING DATA ACCESS TO ORGANIZATIONAL DATA MAINTAINED IN HIERARCHICAL

FIELD OF THE INVENTION

One or more implementations relate generally to organization management, and more specifically to managing access to hierarchical organization data through a graphical user interface system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Business organizations typically have a large number of people who are organized into hierarchical relationships. These relationships define lines of responsibility and reporting, and impose certain privileges and restrictions with regard to the access and management of information within the organization. In general, an organization may have any number of employees or departments that are related to one another in a large number of different supervisor and subordinates roles. To ensure the smooth operation of these organizations, access to organizational information must be strictly controlled to ensure that only authorized people have access to sensitive information. This strict access and control is often complicated by the fact that many large organizations have hierarchical structures that involve many different entities. Moreover, certain situations may require granting of information access outside the traditional hierarchical framework, such as a manager temporarily conferring certain supervisory rights to an administrative assistant.

The hierarchical organization of a company or large entity is typically represented in the form of the familiar top-down organization chart or tree. Present graphical user interface (GUI) techniques and management applications facilitate the design and modification of organization charts for various incarnations of a company. Such applications, however, generally treat the entities (people, departments, positions, etc.) as graphical elements that can easily be moved around a display area. In reality, however, each entity represents a resource that has a significant amount of data associated with it, some of which may be highly sensitive. Access to such information in an organization is often tightly controlled, based on the hierarchical relationships of these entities. Such granting of data access rights based on rigid, pre-defined hierarchical relationships can limit the flexibility of the organization with regard to certain management tasks, such as fast decision-making, flexible reporting, and evaluating different organization scenarios.

Present methods of reorganization or evaluating different organization chart scenarios typically involve the recalculation of hierarchical relationships and access rights for each individual of an organization. For a large organization, such a change can take a significant amount of time and require significant processing resources. Such processing costs and resource overhead often discourages the testing of certain "what-if" scenarios, succession plans, and reorganization models. Though data access to perform such tasks can be granted to certain individuals, this often forces a supervisor to grant total permissions to a subordinate, thus potentially allowing the subordinate to have too much access to corporate information. Temporary credentials can be generated and used, however, this also requires increased administrative processing.

What is needed therefore is an organization information management system that alters organizational access in real time in response to changes in the hierarchy.

BRIEF SUMMARY

Embodiments are generally directed to processing organizational data represented in hierarchical chart format in a graphical user interface system. A data organization process defines a hierarchical plurality of boxes representing the organization and processes data access requests from users who may desire changes to the boxes and their hierarchy. The method of controlling access to information in the organization through the data access process includes defining security roles that dictate rules to compute availability of organization chart boxes and their attributes for the requesting user. The availability of a requested box is computed based on information within requested box and/or its location within organizational chart's hierarchy. The process further defines mapping rules between users and boxes within the organization. The matching of mapped boxes to users generates principal boxes for the user. The process defines mapping rules between principal boxes and roles, based on conditions to identify principal boxes. The mapping of users to principal boxes is accomplished through a chart user ID, and the mapping of principal boxes to roles is done by role assignment rules. Upon a data request for information regarding specific boxes, the process re-identifies in real time the user's principal boxes, retrieves statically granted roles, identifies the roles to grant via rules on principal boxes, and then a plurality of available boxes and their attributes. Dynamic role assignment happens through a change in the role assignment rules, chart user ID field value on boxes, and chart user ID value on user record. This allows a user with a limited scope of information access to assume a different level of information access by simply changing the chart user ID in user properties for specific organizational chart, or changing the role assignment rules. With dynamic, real-time re-computation of effective access control policies upon each request to data, access grants and hierarchical reorganizations can be implemented without persisting complete access control lists for each and every user in the organization.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

FIG. 7 is a table that illustrates different examples of effective sets of polices based on specific configurations of roles and chart user.

FIG. 8 is an example user record, under an embodiment.

FIG. 9 is an example chart user ID field, under an embodiment.

FIG. 10 is an example record access editor for a graphical user interface (GUI), under an embodiment.

FIG. 11 is an example planning mode editor for a GUI, under an embodiment.

DETAILED DESCRIPTION

Systems and methods are described for representing and managing organizational entities in a graphical user interface system, and for controlling access to organizational data maintained in a database system. Aspects of the one or more embodiments described herein may be implemented on one or more computers executing software instructions. The computers may be networked in a client-server arrangement or similar distributed computer network, and one or more of the networked computers may host web pages that are accessed by one or more client computers through web browser programs.

Organizational Data Access

An organizational chart (also called an organization chart or org chart) is a diagram that shows the structure of an organization and the relationships and relative ranks of its parts and positions/jobs. A hierarchical organization is an organizational structure where every entity in the organization, except for the top or leader entity, is subordinate to another entity. In an organization, the hierarchy usually consists of a single individual or group at the top with subsequent levels of power beneath them. In general, the hierarchical structure is the dominant mode of organization among large organizations, such as corporations, governments, clubs, the military, and similar organized groups. Members of hierarchical organizational structures primarily communicate with their immediate superior and with their immediate subordinates. Structuring organizations in this way is beneficial because it defines strict reporting and responsibility guidelines, which helps streamline communications and reduces over-delegation and conflicts of interest. A consequence of the hierarchical organizational structure is that it limits access to information within an organization, and can limit the flexibility of the organization in terms of redefining roles and relationships for specific purposes.

Embodiments are directed to a system and method for representing and processing hierarchical representations of an organization in a manner that facilitates access to information within the organization and re-organization of the personnel in real-time to help implement the application of flexible business logic to organizational models. An organization chart may be either position-based or person-based. A position-based chart illustrates the different functional positions within the organization and contains information regarding the position, such as the hierarchical relationship of the position to other positions within the organization, the identity of the person presently occupying that position, and other relevant position oriented data. A person-based chart illustrates the people within an organization and their hierarchical relationships based on their current positions or privileges within the organization.

Figure 1A:
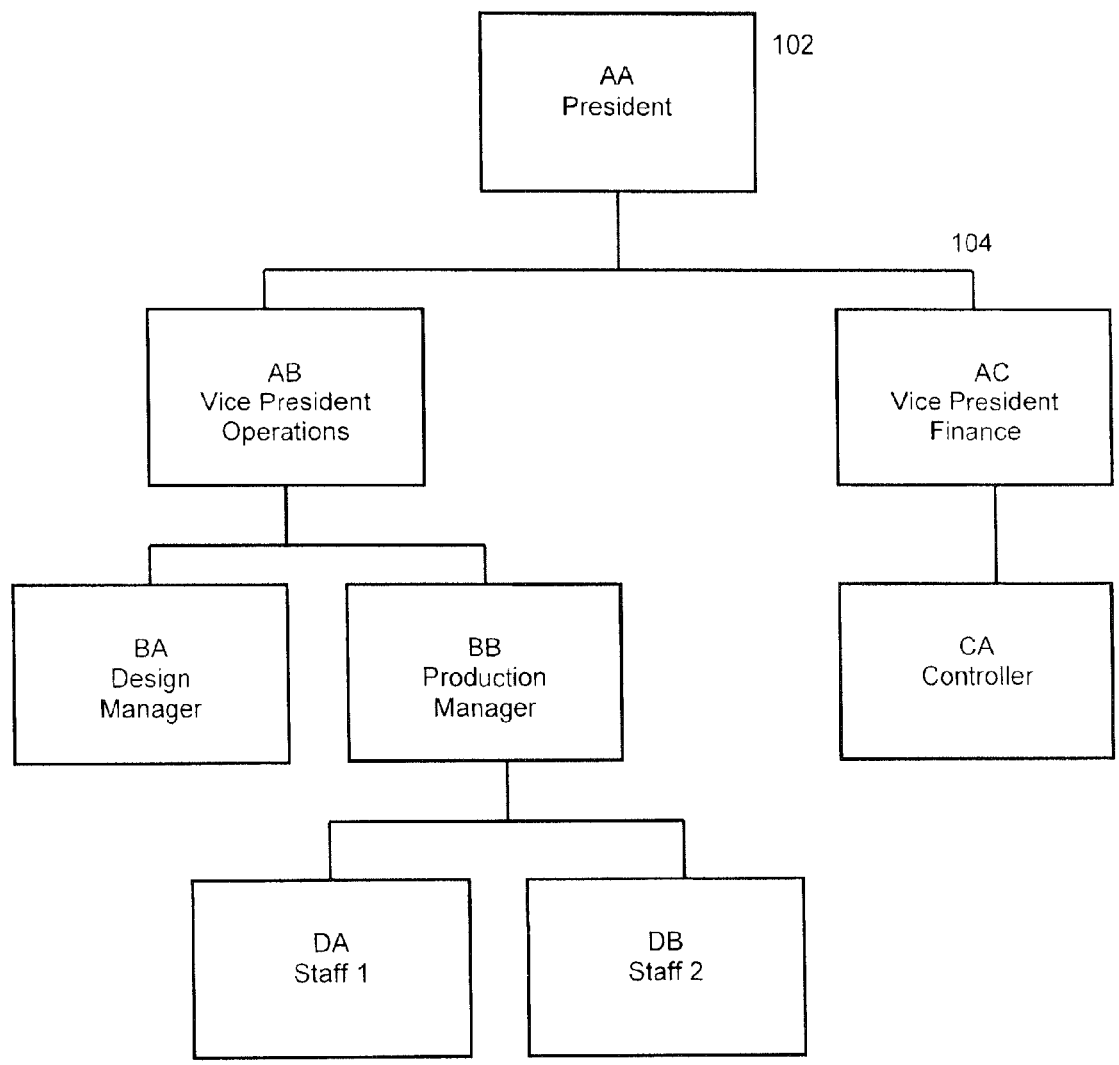
FIG. 1A illustrates an example hierarchical organization box that illustrates aspects of an organization chart processing system, according to embodiments.

FIG. 1A is an example organization chart that illustrates aspects of an organization chart processing system, under an embodiment. The organization chart 100 comprises a number of boxes 102. The organization chart 100 of FIG. 1A is a position-based chart that illustrates the high-level management portion of an example corporate organization. Each box 102 contains information regarding the people in the positions, as well as certain information regarding the positions themselves. When represented in a GUI-based processing system, each box essentially represents a link to a data record relating to the person or entity represented by the box, where the data record is part of an overall database that stores the organization information. The data records for each box typically comprises a number of fields, each containing a specific type of data. For personnel, the data fields could include name, position, age, gender, start date, salary, and other relevant items of information. The lines 104 between the boxes indicate the reporting and authority lines among the positions. As shown in FIG. 1A, the boxes include the name of the position, e.g., President, Vice President, Staff, etc., and the name or initials of the person presently occupying each position. For the example of chart 100, person AB is the Vice President of Operations and reports directly to the President, AA, and also has responsibility over two managers, who in turn have responsibility over a number of subordinates, such as various staff members. The organization chart 100 defines the superior/subordinate relationships within the organization in a top down manner so that only positions that are above and directly connected to a lower position have access to information and power to delegate over the lower positions.

In general, the hierarchical links 104 also imply data access rights to information about other boxes in the organization. That is, a superior box usually has full access to information about a subordinate box, e.g., the VP finance box can access information about the controller box, but not any of the other boxes in the chart. In some organizations, however, data access does not necessarily follow the hierarchical linkages, and data access is granted only according to custom rules or other defined basis.

The organization chart 100 is a representation of the data of an organization that has a hierarchy and is represented by the relative graphical position of the boxes in the user interface. A box is an entity that is generated by an appropriate organization database or data management program. The boxes themselves are generated by specific application software, and are generally not imported into or exported from the system. Boxes that are defined within the system can be populated by a program importing data from an external data source, such as a human resource (HR) records database, or as a result of direct user entry through an interface program, such as editing functions (e.g., new, copy, cut/paste, and so on). Each box is an object that serves to store or reference data associated with the person and/or position represented by the box. The box can contain content data about the person/position, as well as metadata that provides information about the box itself. Each box 102 is identified by a unique box identifier (BoxId), and exist within the content of the overall chart 100.

Figure 1B:
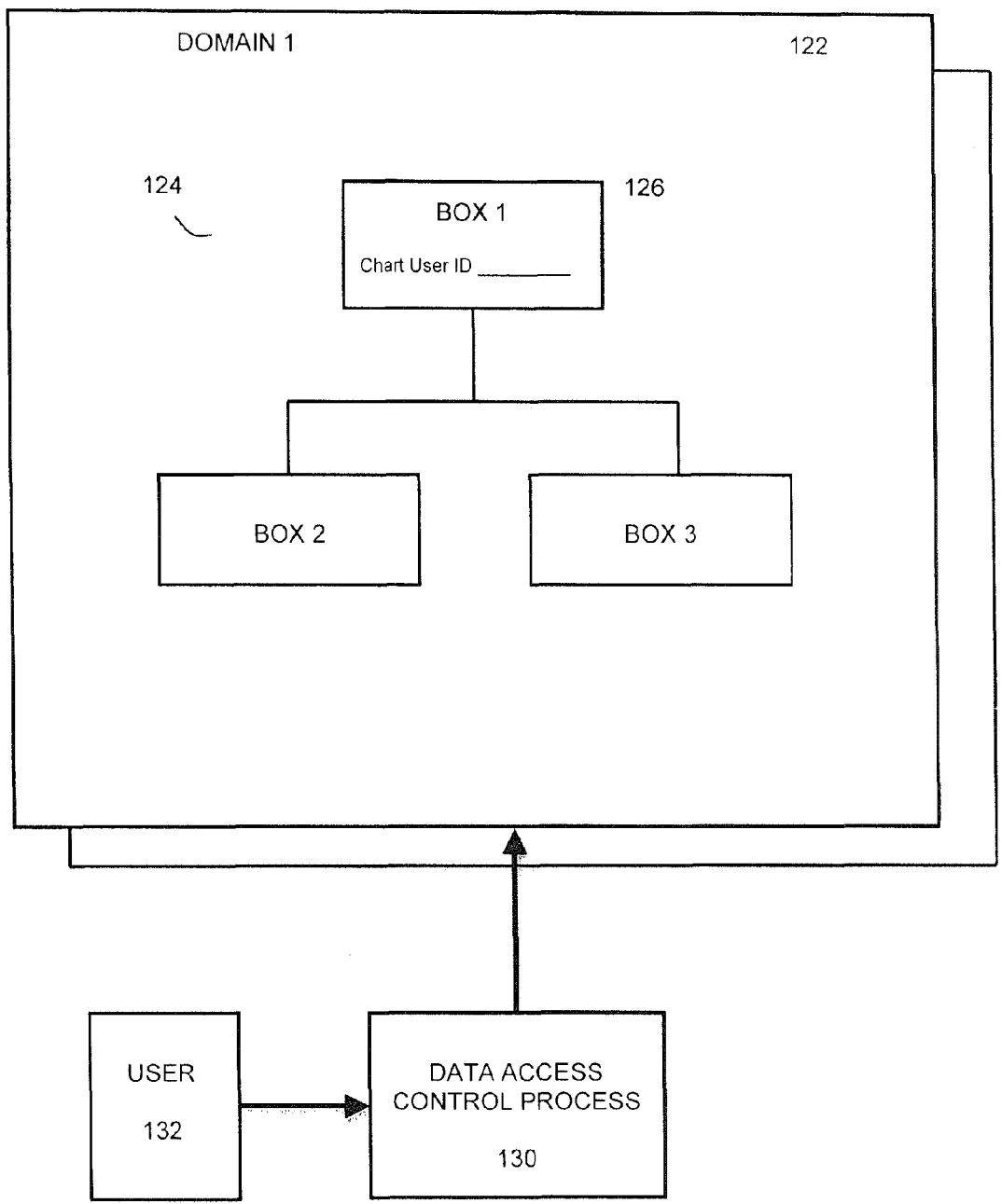
FIG. 1B illustrates the representation of organizational data and an interface to a data access control process, under an embodiment.

In an embodiment, the organization chart 100 illustrates an instance of representing organizational (personnel and resource) data that may be processed in a data access control system that controls access to information in the organization. The organizational data may be modeled and embodied in various different ways to facilitate the database management and data access control mechanisms. FIG. 1B illustrates the organizational data 120 of an organization where such data comprises information such as personnel identifiers, reporting relationships, personal names, position titles, salaries, hire terms, and other relevant information. Organizational data 120 is typically stored in one or more databases and may be sourced by various methods, such as data files, or direct input by users through a GUI.

For the embodiment of FIG. 1B, the organizational data 120 is represented as collection of domains 122. Each domain, such as Domain 1 contain one or more charts 124, which in turn contain data entities represented as boxes 126. A domain holds the field definitions and settings for its charts. Each box 126 is an object that exists in the scope of a chart and has a hierarchical relationship to other boxes. Boxes are used to represent reporting relationships among the persons of the organization. Boxes may link to other data entities, such as persons, positions, or assignments.

Certain boxes are denoted and function as principal boxes within a chart. Principal boxes are used to perform rule-based assignment of security roles, and also to compute structural conditions for data access control. A security role comprises configuration information and one or more rules used for data access control. Roles can be statically granted to a user in a domain; roles can also be granted using role assignment rules. Rules are used to dynamically grant a user some roles in a domain, for each individual request to a specific chart. Rules define a box-level condition that operates on principal boxes for the requesting user.

For a specific chart, a principal box is any box in that chart where the value of chart user ID field equals the given chart user ID. For the example chart 124 of FIG. 1B, Box 1 is a principal box for chart 124. As shown, the principal box has a chart user ID field that is a field that is used to identify Principal Boxes in charts of the domain to which this field belongs. The chart user ID field holds a chart user ID value, which is a value that is used to identify principal boxes in a chart of some domain. Chart user ID values are attached to a user record for each domain.

In an embodiment, the organizational data 120 is accessed through a data access control process 130, which implements a method of restricting access to particular entities and attributes for a specific user 132. Access can be controlled and granted on various levels, such as record-level and field-level. Record-level access control is used to restrict access to an entire entity or data object (e.g., box). Field-level access control is used to restrict access to particular attributes of entities. Configuration for record-level and field-level data access control uses two kinds of conditions: structural and box-level. A structural condition operates on the position of the queried box in relation to the principal boxes. A box-level condition operates on the field values and the hierarchy attributes of the queried box. A user 132 is an entity that defines authentication credentials. It carries additional information, such as static bindings to security roles, and the values of chart user IDs for individual domains.

The data access control process effectively provides a method of controlling access to information in an organization, by structuring organizational data into domains and charts, where domains contain charts, metadata, security roles and role assignment rules, and charts serve as containers for different or same subsets of organizational data. The organizational data is structured within a chart following the hierarchical relationship of entities in the organization, in which each entity (such as person or position) is represented as a box in that chart, and other related entities (such as person, position, assignment) are tied to that box. Users are identified by authentication credentials, either statically or by accepting user information from external systems with each request. The process provides a way to map user records to their principal boxes in charts, using chart user ID values which are defined in user records, and defines security roles that dictate record-level and field-level data access control configuration, using structural and box-level conditions. Security roles are statically granted to users by explicitly configuring the link between a user record and a role, and role assignment rules are dynamically grant roles to requesting user. The process identifies principal boxes for user within a chart, and then runs the role assignment rules on those principal boxes to grant the appropriate data access to the user.

The data access control system provides a way to manage access to information in an organization, and includes several processing components, including a component for storing organizational data records relating to resources in the organization, a graphical user interface (GUI) component defining and displaying a hierarchical relationship of the resources, wherein each resource is represented as a box in an organization chart of the organization, a configuration component defining users and other security configuration for the organization, and a data access component configured to recompute effective policies and plurality of available boxes and fields in real time for a requesting user.

System Implementation

Figure 2:
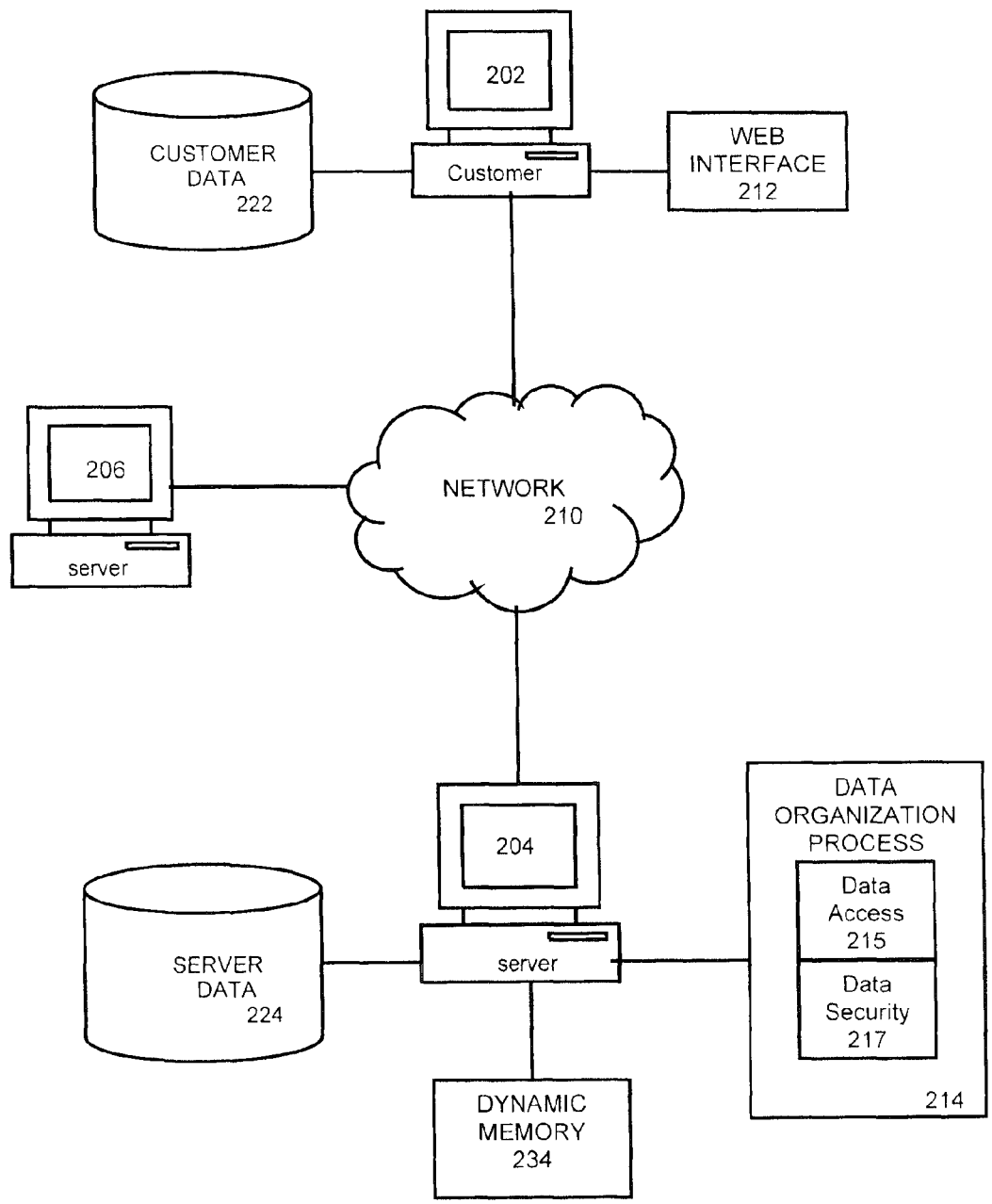
FIG. 2 illustrates a computer network system 100 that implements a data organization process, under an embodiment.

In an embodiment, the organization data management and data access processes for a company implemented in one or more computer-implemented methods that may be executed on a server computer that is remote from the customer site, but that uses customer provided data. FIG. 2 illustrates an example of computer network system 200 that implements a data organization process, under an embodiment. In system 200, an organization computer 202 is coupled to network 210 through appropriate network interface components (not shown). The customer computer 202 is typically a workstation or personal computer class device, but may also be embodied as a client processing device, such as a laptop computer, netbook, smart phone, tablet, personal digital assistant (PDA) or similar mobile communication device. A server computer 204 is also coupled to the network 210 and executes a data organization process 214. The server computer 204 may be implemented within any suitable networkable computing device, such as server-class computers, workstations, personal computers, or any similar device capable of hosting applications accessed over network 210. Network 210 may be the Internet, a Wide Area Network (WAN), a Local Area Network (LAN), or any combination thereof. For embodiments in which network 210 is the Internet, the networked computers may the other computers and other resources through appropriate web interface components 212 (e.g., web browser and web server processes). In a typical implementation, one or more of the server computers in system 200 may be World-Wide Web (WWW) servers that provide Hypertext Markup Language (HTML) pages and process remote service calls over the network 210 to client devices and other networked computers 202.

The customer computer 202 is typically operated by a company or organization that may maintain its own copy of organizational data in a locally maintained data store 222. Such data may include personnel data managed by the human resource (HR) department of the organization, but is not so limited. The customer data is transmitted to server computer 204 and processed by the data organization process to provide different representations of the customer data in the form of hierarchical charts, reports, and other representations. A data store 224 coupled to server 204 may be used to store intermediate and/or final forms of the data as it is processed.

In the embodiment of FIG. 2, the data organization process of FIG. 2 is illustrated as a server-side process executed on a server computer 204 remote from the customer computer 202. In an alternative embodiment, this process may be implemented and executed as a client-side process that is local to the customer computer. The customer data provided to the data organization process 214 may be sourced from a database, or it may be sourced, at least in part, by direct user input provided through a graphical user interface (GUI) executed on customer computer 202. One or more items of customer data may also be provided by a supplemental system, such as server 206.

In an embodiment, the customer data processed by data organization process 214 comprises hierarchical data that describes an aspect of the customer entity. A typical set of customer data includes the organization of people and positions (officers, employees, contractors, temp workers, etc.) of a company. In this case, the customer data 222 typically consists of personnel records that list various items of information related to the employment of persons or open positions, and that is stored in some sort of personnel database that is maintained by the company. The data organization process 214 utilizes the hierarchical nature of the data and defined rules to allow access to the data and manipulation of the data to generate organization charts, reports, reorganization modeling, advanced search techniques, and other applications to the data.

For purposes of the following description, reference will be made primarily to data that comprises HR or personnel data and that is provided or displayed in the form of an organization chart. It should be noted however, that embodiments may also be applied to any other type of entity data that is amenable to a hierarchical representation. This can include positions, ranks, departments, sub-departments, facilities, offices, and so on.

As shown in FIG. 1B, example customer data includes personnel data that is maintained and processed as part of a unified data model. The data organization process 214 utilizes flexible business logic that generates person/position-based models using customizable operations, such as mapping, field customization, and data searching and reporting. The data access components of process 214 maintain the hierarchy awareness through all of the data processing steps. Customer data can be input to process 214 through data transfer over network 210 from a customer data store 222 to a server data store 224, or it can be provided by direct user input through a GUI interface to process 214. A shared database schema is employed for all datasets within the customer data.

The customer data comprises organization chart data that has a defined hierarchy type that is either person-based or position-based. The hierarchy type defines the way that the boxes in the chart are generated and processed. For a person-based hierarchy, a box is created for each unique person. For a position-based hierarchy, a box is created for each unique position, and may be attached to more than one person. A box cannot be empty (i.e., void of any data) and must be attached to exactly one "primary" entity (i.e., one position for position-based hierarchy, one person for person-based hierarchy). A box may have a value for ParentBoxId attribute, which is a reference to parent box by identifier. The ParentBoxId value for a box is derived from reporting relationship information in the external source, or is determined by the user when editing the reporting relationships in the organization chart. A box cannot have more than one parent; however, since persons can be attached to multiple boxes in position-based hierarchy, it is possible to represent matrix reporting structure from the data structure for the chart.

The data organization process 214 includes functional components or modules that process the hierarchical chart data to allow accessibility to the chart data (i.e., data records and fields) by users within the organization and authorized third parties. In an embodiment, the modules of the data organization process include a data access engine 215 and a data access security component 217. For the purposes of the present description, the terms "component," "module," "engine," and "process" may be used interchangeably to refer to processor-based functions that execute instructions through either software programs, hardware circuits, or a combination of hardware and software elements.

The data access engine (or process) 215 provides an advanced querying function for the organization data that is API (application program interface) based. The data access engine provides basic rowset features including paging, sorting, full-text querying, ad-hoc filtering on fields and hierarchy attributes, and the formation of custom expressions. It also provides hierarchy-based query functionality, such as queries by chart level from the top or bottom of the chart, by number of levels up or down from a given box, and by hierarchy attributes of a box (e.g., hierarchy level number, path in tree, depth in chart, number of children, etc.). The data access engine 215 also provides hierarchy-oriented querying based on chain of command, or back/forward incremental search in the organization tree. Data modeling is facilitated through model-based features, such as computing alternate managers (matrix reporting), alternate staff, corporate reorganizations, departmental reorganizations, and so on. The data access engine 215 is optimized for scaling, depending on the requirements and constraints of the entity and application. The system may use a SQL (structured query language) database to store security and other configuration information. A load balancer process can be used to deploy a virtually unlimited number of processes, and software processes and hardware resources can be added or removed as needed.

Data Access Policies

An organization's data can be represented by one or more domains, each of which can include one or more charts. Domains usually represent different subsets of people/positions in the organization. Each domain has a "Chart User ID Field" setting. This setting defines which field to use to match boxes. A user has a unique chart user ID value for each domain. For example, a particular user can have chart User Id "125" for domain "Employees", and a chart user id "AX-01-B4" for domain "Secret Operations", and this value is matched against chart user ID field with name "Employee ID" for charts of domain "Employees", and against the field with the name "Nickname" for charts of domain "Secret Operations".

The process dynamically identifies principal boxes upon receipt of a data access request based on chart user ID. To identify principal boxes, the data access process performs the following steps: it first determines which field is the chart user ID field for the chart. This information is taken from the domain metadata, which is known as long as the chart is known. The process then determines which value to use to match chart user ID field in the chart. This information is taken from the user's properties, it is a value explicitly configured for user for each domain. The process then selects all boxes from the chart that have a chart user ID field value that is equal to the chart user ID. Basically, on each box a processing algorithm will look through all attached entities (persons, positions etc) and check which of those has the required field, and then match that field's value against chart user ID.

Figure 3:
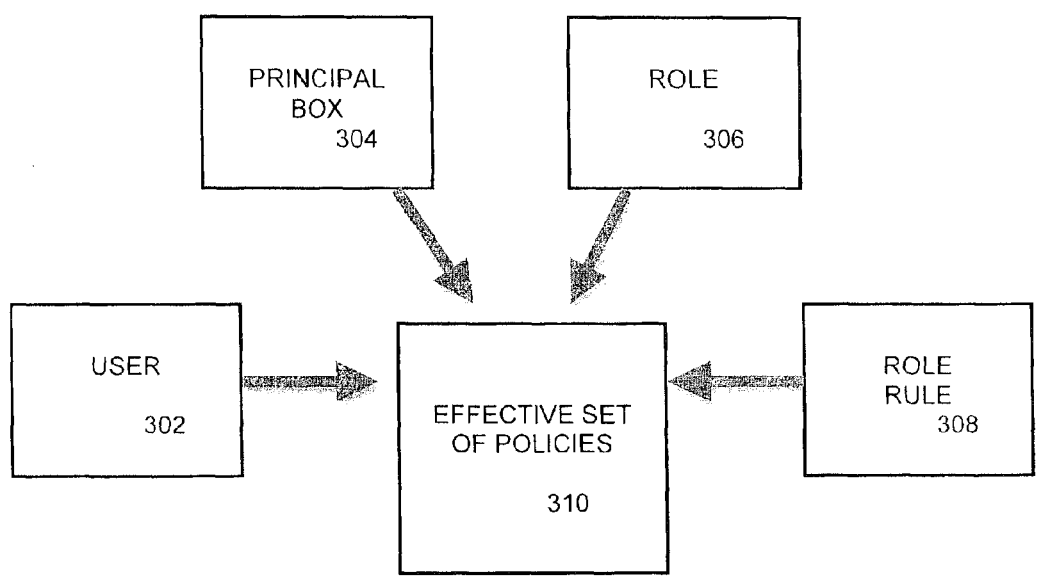
FIG. 3 is a diagram that illustrates the components that define the set of policies that control accessibility of the data records, under an embodiment.

The data access security component 217 defines and implements policies that control the accessibility of the data records and individual fields of these records. Accessibility generally refers to the ability of a requesting user (who may or may not be an employee or member of the organization) to access the data (content and/or metadata) contained in or reference by a box in the organization chart. FIG. 3 is a diagram that illustrates the components that define the set of policies that control accessibility of the data records, under an embodiment. As shown in diagram 300, the effective set of policies 310 that control the accessibility to the data by a user 302 is determined by the identity of the user and static characteristics of the user 302, the principal box 304 of the user, the user's role 306, and the role rule or rules 310 associated with the role 306. The data access security component 217 is role-based in that the roles contain policies to control the accessibility of the records and fields. Roles are assigned statically through explicit binding to a user record, and dynamically through the set of principal boxes identified at run-time ("on the fly") for each request. Roles are conditionally bound to principal boxes, and multiple boxes can match. A chart user ID is a value held by a user account separately for each domain, and which is used to match principal boxes within charts of that domain. A principal box is a box that has at least one person bound to it, and one of the fields on that person is exactly equal to the chart user ID value. The field to be matched against chart user ID value can be chosen individually for each domain. The access control configuration by component 217 can restrict access to boxes and/or individual attributes, and it can use structural (relative to principal boxes) and record-level conditions on any property or hierarchy attributes, including custom expressions.

Changes to the accessibility of data take effect immediately after any change in configuration or business data. The mechanisms that enable this feature include static configuration (user, role, statically granted roles, role assignment rule, chart user ID value on user, chart user ID field on box), dynamically computed configuration (principal boxes, rule-assigned roles), and real-time re-computation of the accessible boxes and attributes per each request based on static/dynamic configuration items for data access control. The identification of principal boxes is driven by business data and the chart user ID value for the user. Changes to the chart user ID field values on boxes in a chart can immediately change the set of principal boxes for an existing user, and thus have a cascading effect on the effective set of policies for a request. Also, any change in business data can immediately change the effective set of policies for a given principal box.

Figure 4:
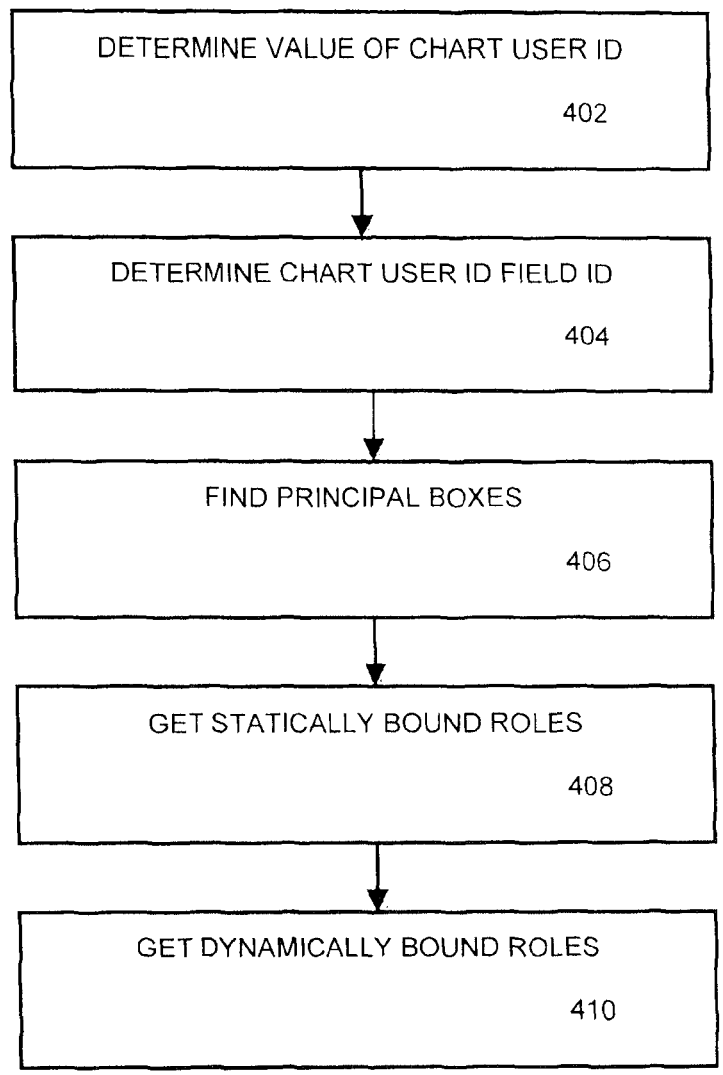
FIG. 4 is a flowchart that illustrates a method of computing an effective set of policies, under an embodiment.

FIG. 4 is a flowchart 400 that illustrates a method of computing an effective set of policies, under an embodiment. The process begins by determining the value of the chart user ID, block 402. By default this is the login name of the user (e.g., user@org.com), and may be a fixed identifier, such as the e-mail address of the user. In block 404, the process determines the chart user ID field ID. This default can be the work e-mail field for the user. The process then finds the principal boxes, block 406. In this step, the process matches the chart user ID value against the chart user ID field on all boxes in the dataset. The process then obtains roles, which can be both statically bound and dynamically bound. The static bound role for a user may be obtained by simply reading the role from the user's data record, block 408. The dynamically bound roles may be obtained by executing role rules against all found principal boxes, block 410. The process 400 thus provides the necessary information related to the user 302, principal box 304, role 308, and role rules 310 required to calculate the effective set of policies 310.

Figure 5:
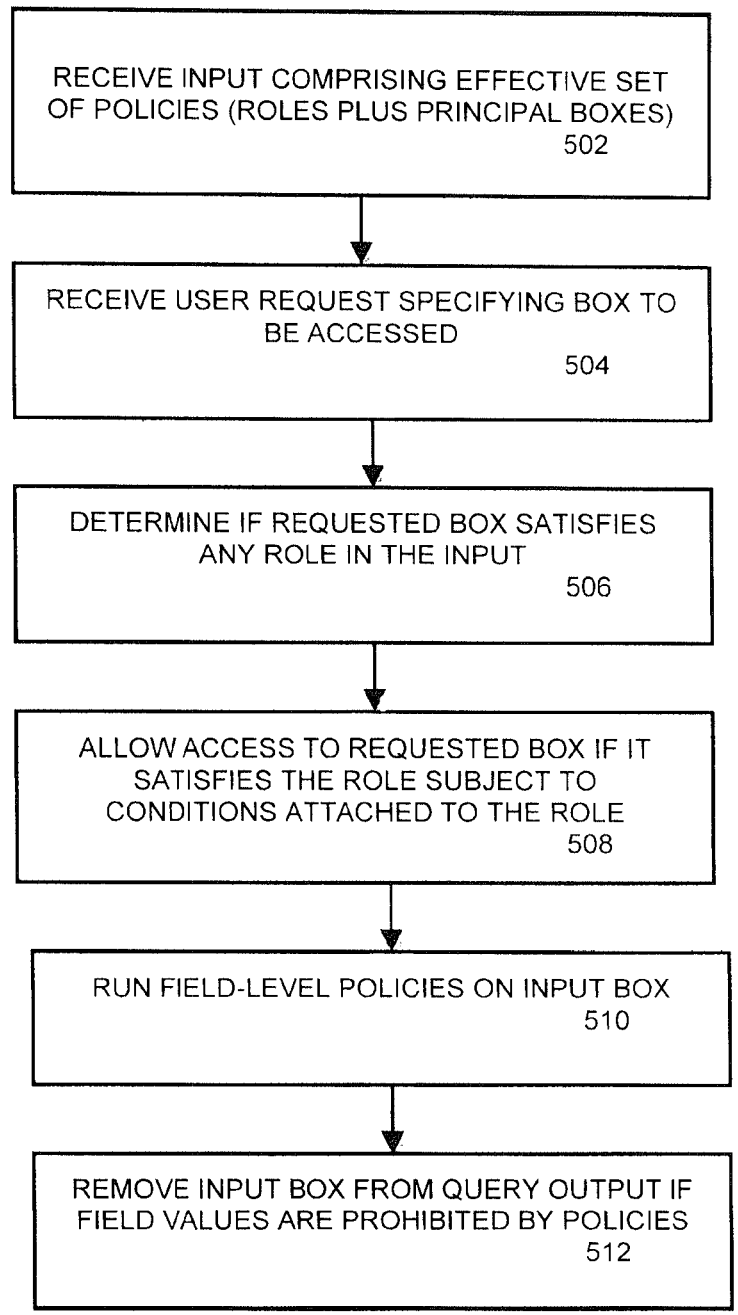
FIG. 5 is a flowchart 500 that illustrates a method of determining the availability of a box, under an embodiment.

The effective set of policies 310, along with other information is used to determine the availability of a box in the organization tree to access by a user. FIG. 5 is a flowchart 500 that illustrates a method of determining the availability of a box, under an embodiment. The process 500 begins by taking the input comprising the effective set of policies, which includes at least some roles, as well as the principal boxes of the chart, block 502. The other component of the input comprises the box or set of boxes that are requested to be accessed, and which may be retrieved by the data access engine 215 based upon a user's request, block 504. The process analyzes each individual box in the input set to determine if the requested box satisfies any role in the input, block 506. A box is removed from output if no roles allow it. Access to the requested block is then allowed if it satisfies the at least one role, subject to any conditions attached to the role, block 508. Roles may have conditions of different kinds, like structural condition that allows matches to all boxes (full chart) or matches to only a set of boxes in the chart (relative to principal boxes). The relative structural conditions compare the position of the requested box to positions of principal boxes to match the relative definition (such as "self" and subordinates, or N levels above "me"). For example, a relative structural condition may allow access only if the requested box is a child of a principal box or is a supervisor of a particular level. If an input box is allowed, field-level policies are then run on it to determine the availability of particular fields in the allowed box, block 510. If all field values are prohibited in a box due to the field-level policies, the box is removed from the query output, block 512. Similarly, if the requested box does not satisfy at least one role in the input in block 506, it is removed from the query output.

The availability of a field within a box is determined through field-based policies that are defined as part of the roles. The field-based policies have hierarchy and filter-based conditions. As shown in FIG. 5, each input box that is determined to be allowed to be accessed by the box-level policies is evaluated under the field-level policies. Values for prohibited fields are replaced with empty values in the query output. For the purposes of all sorting, filtering, and full-text matching in constrained context (except computations related to data access control itself), they are empty fields. If all field values are prohibited in a box because of the field-level policies, the box is removed from the query output, as shown in block 512 of FIG. 5.

In an embodiment, the rules that define the availability of boxes to be accessed and manipulated by entities within the organization comprise security roles of the organization. A security role is an aggregate piece of configuration, portions of which are used for different purposes. In an embodiment, the pieces of configuration include, but are not limited to: features, starting point, domain mode data access control, and planning mode data access control. With regard to the features, each role holds an access control list for product features. In a user interface, this is basically a set of checkboxes, each of which allows a particular feature to be granted to the role's grantee. With regard to the starting point, whenever a user enters the chart for the first time, or explicitly clicks the "navigate home" button or similar functional button, the application uses this setting to determine the starting box. The starting box is the first box that a user sees when he or she first logs in. The domain mode data access control limits access to boxes based on the identity of the inquiring user so that whenever a client sends a query for boxes, only those boxes that satisfy domain mode data access control settings are returned in response. The planning mode data access control dictates which boxes can be edited by a user who is allowed to read the boxes.

In an embodiment, role rules grant roles to boxes within the organization chart. The system can determine which role should be applied to a user by applying a role assignment rule to the principal boxes that correspond to the current user. A role rule includes one or more conditions. When any user's principal box meets the condition in a rule, the related role is applied to that user. Before assignment rules are created, the roles to be applied must be created. A GUI function provides a function to create a rule, edit a rule, and delete a rule, among other operations. For each created rule, a set of conditions can be defined for the rule.

Figure 6:
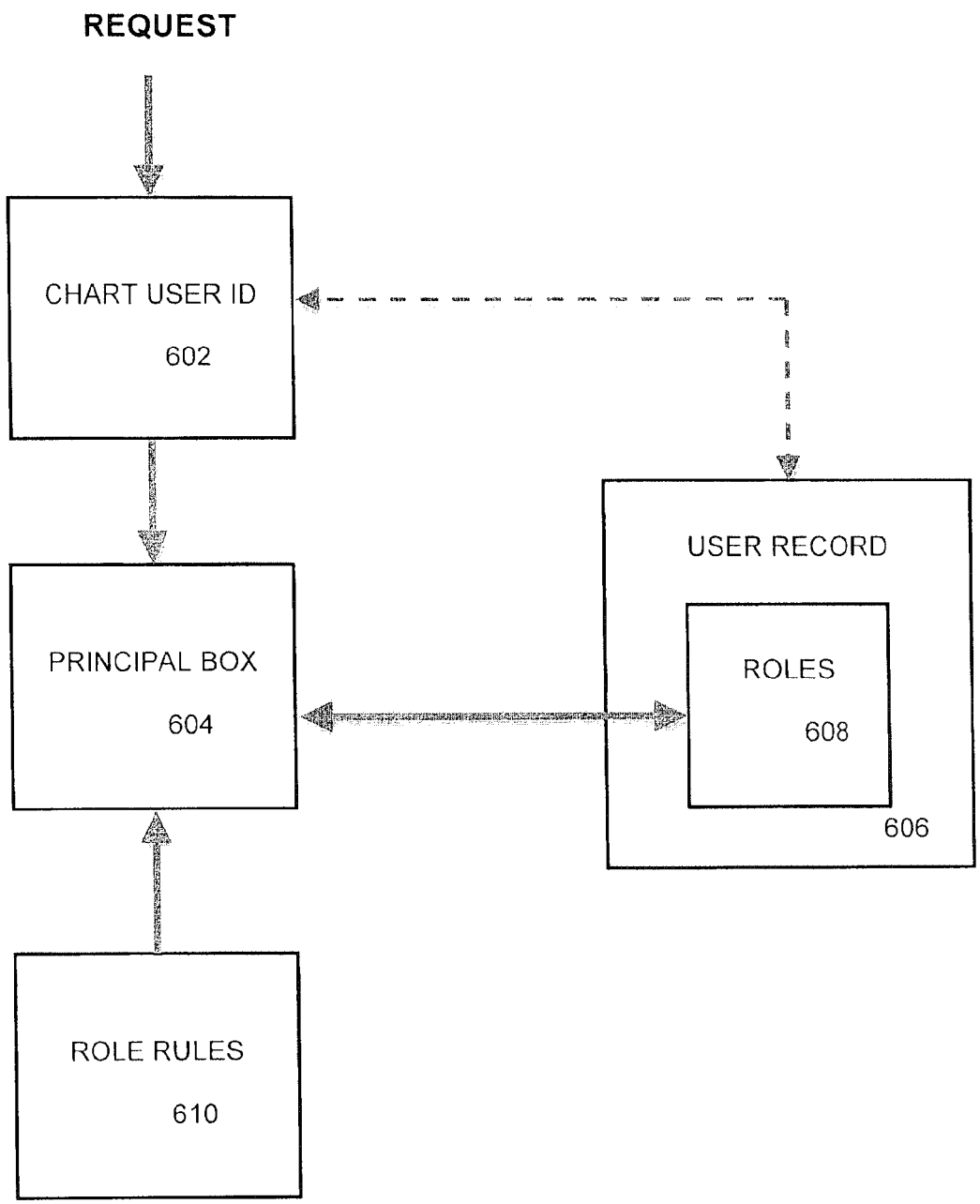
FIG. 6 is a block diagram that illustrates the processing of an access request through data access control properties and principal boxes, under an embodiment.

Each user has two properties related to data access control, namely domain-specific chart user ID values, and the statically granted roles. These two properties are used in conjunction with dynamically identified principal boxes and applicable role rules to determine the access rights of a requesting user. FIG. 6 is a block diagram that illustrates the processing of an access request through data access control properties and principal boxes, under an embodiment. As shown in FIG. 6, a data access request ("request") from a user ("requesting user") specifies a box within the organization chart about which the requesting user would like to gain information by accessing its data. The request can identify the requested box by specifying a position within the chart, a person within the chart or a GUI implemented selection of a box or domain in the chart. The chart user ID 602 is used to determine the principal box 604. Upon receiving the request from the user relating to a box in the organization chart, the data access component 215 re-computes in real-time effective set of policies for the requesting user. Zero or more principal boxes 604 are defined for the requesting user upon each request. The principal box 604 has a value in its chart user ID value field that matches the chart user ID 602. The principal box 604 is identified for requesting user record 606. One or more roles 608 are explicitly granted in the user properties of the user record 606. This constitutes the static granting or assignment of roles that are explicitly bound to the user. The chart user ID 602 is matched against the chart user ID field of all boxes in the dataset to identify principal boxes to be used when executing role assignment rules and when applying structural conditions. The roles 608 within the user record corresponding to the chart user ID 602 are conditionally bound to the principal box 604 through the execution of role rules 610 on the found principal box 604. The statically bound roles 608 are simply read from the user record 606. The applicable role rules 610 for the role 608 are then executed against the found principal box 604 to generate at least part of the effective set of policies governing access based on the request. The effective set of policies refers to all roles granted to the user, such as through the union of granted roles and roles granted through rules on principal boxes.

FIG. 7 is a table 700 that illustrates six different examples of effective sets of polices based on a specific configuration of roles 608 and chart user ID's 602. In a first example, the Role1 for user@org.com is set to "entire chart". This role is explicitly granted in the user record 606. The effective set of policies for the user in this example is that the entire chart is available for access by that user. In a second example (row 2), the Role1 for user@org.com is set to "entire chart AND filter" where the filter is set to "Department=Finance". In this case the effective set of policies allows the user to access all boxes in the chart where the Department field equals "Finance". In a third example (row 3), the Role1 for user@org.com is set to "subordinates" and the chart user ID value for the user record is set by default to the user login name (user@org.com). A found principal box for user "John Doe" is returned if the WorkEmail field value for his user record is equal to "user@org.com". In this case, the boxes of subordinates of John Doe are available, but the John Doe box itself is not available for access. If the role had been set to "self and subordinates", the John Doe box would then be accessible as well. In a fourth example (row 4), the chart user ID is set to "John Doe, the chart user ID field is set to "Full Name" and the Role1 is set to "subordinates". The returned principal boxes are those that have the FullName field set to "John Doe", and in this case the subordinate boxes of John Doe are available, but not the John Doe box itself. In a fifth example (row 5), the chart user ID field is set to "Full Name" and the Role1 is set to "self AND filter ("Department=Finance"). The returned principal boxes are those that have the FullName field set to "John Doe", and in this case the subordinates of John Doe who are in the Finance department are available, and also the John Doe box itself. The sixth example (row 6) shows use of rule-based role assignment. Role1 defines structural condition as "self", and a role rule is set to "if Position Title is equal to 'Accountant II', grant Role1." The chart user id values and chart user ID fields may be set to the default values of login name and work e-mail. In this case, the principal box of John Doe is returned if his work-mail matches and the role granted to the user is Role1 if the principal box has a Position Title field equal to "Accountant II." In this case, the John Doe box and its subordinates are available. The examples shown and described with reference to FIG. 7 are intended only to illustrate certain possible policies generated for certain configurations, and are not exhaustive of all possible policies and configurations.

Graphical User Interface Implementation

In an embodiment, the data organization process 214 includes a GUI component that allows various users, such as system administrators, organization officers, employees, and requesting users to interact with the system and make requests to access information in the organization chart, or even reorganize the organization chart. The organization data is stored in a data store 222 in the form of personnel or organization data records. In system 200, user records are the data records (such as people or boxes) that a role can access in the chart.

Access to the chart can be limited to a specific range through filters, along with starting points that provide initial access to the chart.

The GUI can include various different interactive components, such as record and role editors to allow entry and/or modification of user record information. FIG. 8 is an example user record, under an embodiment. The user record 800 includes several different fields of information including user name 802 (typically a login name) and various details about the user (e.g., full name, description, etc.), roles 804 assigned to the user, and the chart user ID 804 for the user. The chart user ID field 804 is matched against the "Person ID" field to find the principal boxes in all charts of a particular domain. FIG. 9 is an example chart user ID field, under an embodiment. The domain name field 902 includes the name of the particular domain, which for record 900 is "SETUP". In conjunction with the user record example of FIG. 8, for the domain SETUP, the values of "123" will be matched against the Person ID field to find the principal boxes of "default_user@opus.com" in all charts of the domain "SETUP". The domain basically holds the field definitions and settings for its charts.

The user record is configured through a graphical user interface that includes a roles editor function. A sub-function, such as a "records—domain mode" tab may be used to select the access range for a particular role. For example, a "top of chart" or top-most box role can access all boxes on the chart. Thus, in the example of FIG. 1A, the President would have access to all of the other boxes on the chart since they are all subordinate to this top box. A role defined as "myself" can access only the principal box, and all subordinate boxes in its branch, that is, boxes below the user's principal box and those directly connected down from that box or connected down through intermediate subordinate boxes. A role can have structural condition set to "Level N Supervisor" or "Level N". This specifies the box in principal box's chain of command that will be used as a root of accessible branch, counting upwards from principal box or downwards from topmost parent. For instance, selecting Level 1 Supervisor gives the role access to its immediate manager and down to the bottom of the branch; selecting Level 2 Supervisor gives the role access to manager two levels above itself and down to the bottom of the branch; and so on. On the other hand, the Level 1 is the topmost parent in the chain of command (which typically is the head of the organization) and down to the bottom of the branch; Level 2 is the next box under the topmost parent in the chain of command of principal box (e.g., Vice President, etc.); and so on. The level-based structural conditions define access to boxes from the selected level in the chain of command of principal box to the bottom of the branch.

FIG. 10 is an example record access editor for a GUI, under an embodiment. This GUI window 1000 allows configuration of user record access and includes a chart range section 1002 and a starting point section 1004. Selecting "top of chart", "myself", "Level N Supervisor", or "Level N" in both sections allows the viewing of information as described above. The filter section 1006 allows for the specification of a condition to execute on the boxes. Filters can include conditions related to virtually any characteristic of the boxes, such as gender, performance, position, start date, and so on. The precedence setting 1008 controls whether to require either or both of the range and filter to be satisfied to allow the box for reading.

Besides simply being able to view information related to boxes in the chart, the system can also be configured to allow the editing and modification of content data associated with at least some of the boxes. This facilitates reorganization of the org chart due to either actual corporate or personnel changes or due to model or trial changes in which different organization scenarios are implemented and assessed for text purposes. A role's planning records are the data records (such as people or boxes) the role can edit in a blueprint function. As with user records, the system can limit editing access to a range of the organization chart, and apply filters to access as well. In an embodiment the planning record access functionality can be accessed through the roles editor program and a "records—planning mode" function. The range for the role can be selected from one of the following options: the "top-of-chart" role, which allows one to edit all boxes on the chart; the "myself" role, which can edit its principal box, and all subordinate boxes in its branch, and the subordinates role, which can edit boxes only beneath itself, but not its principal box; the "Level N Supervisor" role, which specifies how many levels the role can edit above its own level (i.e., level 1 gives the role editing permissions for boxes from one level above its starting point down to the bottom of the branch, level 2 gives the role editing permissions for two levels above its starting point down to the bottom of the branch, and so on); and the "Level N" role, which specifies the highest level on the org chart the role can edit.

FIG. 11 is an example planning mode editor for a GUI, under an embodiment. This GUI window 1100 allows configuration of what records (people or boxes) that a role can edit in a plan. The planning mode editor window includes a chart range section 1102. Selecting "top of chart", "myself", "Level N Supervisor", or "Level N" in this section allows the setting of whether the readable boxes are also editable or not. Non-readable boxes cannot be editable, where the editable function constrains a user's privilege to add, remove, or move boxes around. The filter section 1106 allows for the specification of a condition to execute on the boxes, and the precedence setting 1108 controls whether to require either or both of the range and filter to be satisfied to allow the box for reading.

In general, each box contains a certain amount of content data regarding the person/entity represented by the box. The content data can comprise a substantial amount of data that is typically stored in a database and processed using an appropriate database management program. The data is thus usually stored in the form of fields that organize the content data based on data type or other characteristics. In an embodiment, the system includes a field access function to define field policies that determine which fields a user can view or edit in a chart box. A field policy includes one or more fields, and is attached to a role. When a role is attached to a user, the user can only interact with the specified fields according to the rules of the policy. In an embodiment, the system can include a roles editor program accessible through the GUI that includes a field policy function. The function can be used to select fields to include in the policy, and multiple fields can be entered for the policy. The selected fields are set through structural security rules, and can be used to select: the entire chart, which displays the policy's fields in all boxes; a manager plus subordinates option, which determines the box corresponding to the current user's manager and then displays the field in the manager's box and boxes subordinate to the manager; a manager subordinates option, which determines the box corresponding to the current user's manager and then displays the field in the boxes subordinate to the manager; a self plus subordinates option, which determines the box corresponding to the current user and then displays the field in that user's box and all subordinate boxes, a subordinates which determines the box corresponding to the current user and then displays the field in only subordinate boxes; and a self option, which displays the policy's fields in the box corresponding to the current user. Certain GUI functions can also be implemented in addition to creating and editing policies, such as: "expand all," which shows the fields included in each policy on a users' list; "collapse all," which hides the fields included in each policy on a list, and "delete," which removes a policy from a list.

The system can include feature access provision that controls the features that a user can interact with by limiting which roles can access a give feature. For example, if it is desired that only employees in the HR department should have the ability to print a chart, the printing feature could be restricted only to users in an HR role.

Figure 12:
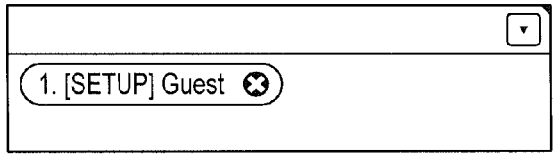
FIG. 12 is an example role rule editor for a GUI, under an embodiment.

Along with statically granted roles, available role rules grant roles to a requesting user via his principal boxes. In an embodiment, roles are granted to the requesting user only, and the system determines what role should be applied to a user by applying a role assignment rule to the data record that corresponds to the current user. A role rule includes one or more conditions. When a principal box of the requesting user meets the conditions in a rule, the related role is granted to that user. Prior to assignment, roles to be applied must first be created. Through the GUI, role assignment rules can be managed by a role rules page that may be accessed through an administrative interface. This page allows for the creation of a rule, the editing of a rule, and the deletion of a rule. FIG. 12 is an example role rule editor for a GUI, under an embodiment. The GUI display window 1200 includes a rule name field 1202 that allows the user to enter a descriptive name for the rule (such as HR, finance, and so on). The "active" checkbox can be selected to make the rule active upon creation. A drop down menu entitled "Apply the Roles" 1204 can be used to select the role(s) that will be granted by this rule. A conditions window 1206 can be used to create conditions for the rule. This function operates by defining the first condition by selecting from the field name and comparison drop-down lists, then entering the comparison string in the contents field. Any additional rules can be defined in the second and subsequent lines by clicking the plus symbol. If a filter includes more than one rule, choose any to apply the filter if one or more of the rules are true, and all to apply the filter only if all the rules are true.

The role rule grants one or more roles to user whose principal boxes satisfy the rule criteria. For example, during the processing of a request, after the principal boxes in the chart for the user have been identified, the process is able to match principal boxes against these role rule criteria and thus dynamically grant roles to the current user during this request. The principal boxes and role rules work in conjunction with the static granting of roles to users.

Figure 13:
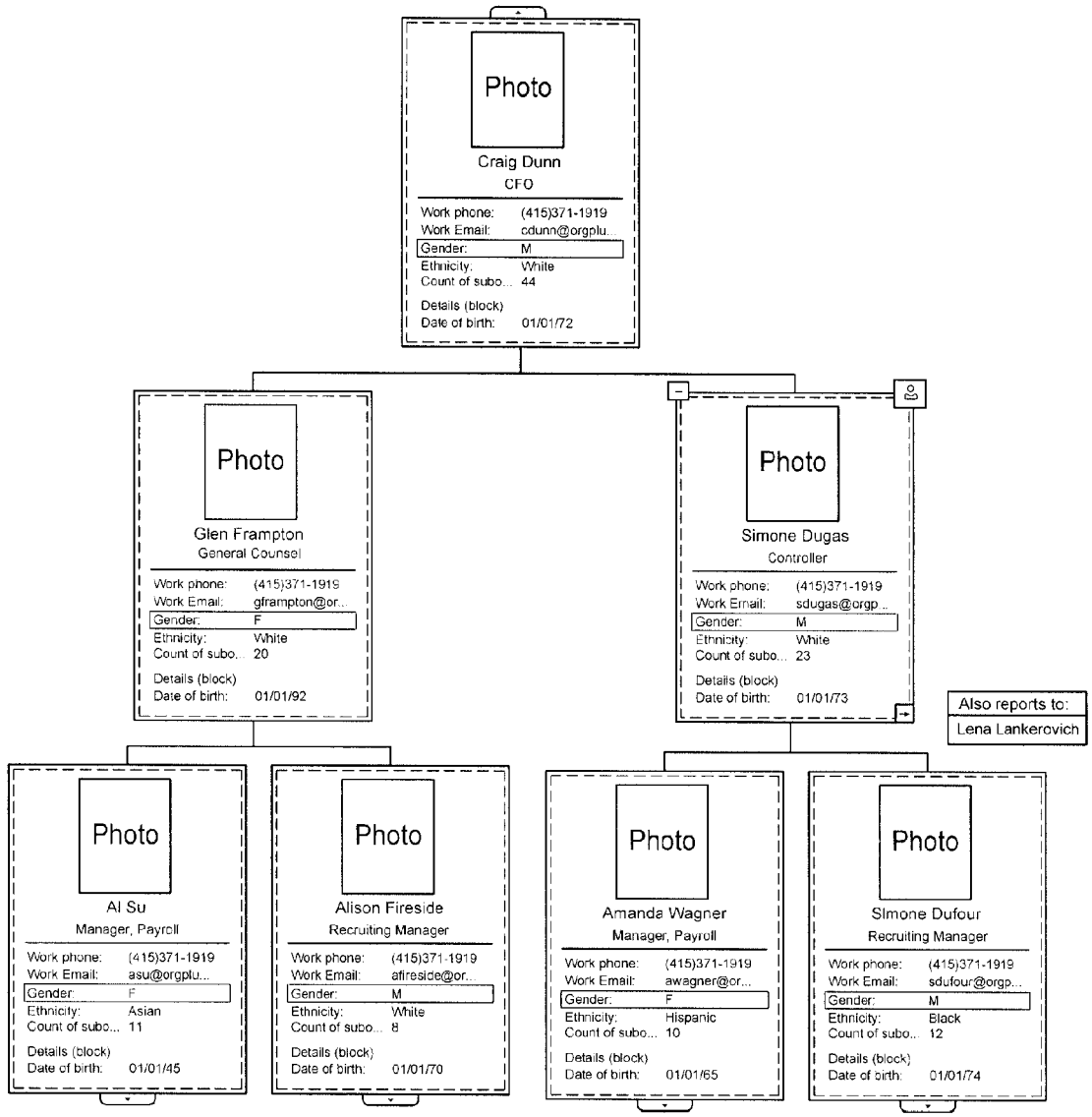
FIG. 13 illustrates a GUI representation and display of an organization chart that can be processed, accessed, and modified using embodiments of a data organization process.

FIG. 13 illustrates a GUI representation and display of an organization chart that can be processed, accessed, and modified using embodiments of a data organization process. Chart 1300 graphically displays a number of boxes populated by different people in the organization. The boxes are attached to one another through hierarchical relationships that dictate lines of reporting and responsibility. Each box has a number of different fields that hold relevant data and information regarding the position and person represented by the box. As shown in FIG. 13, these fields can include name, position, contact information, gender, ethnicity, age, and so on.

For the example of FIG. 13, chart 1300 represents a visible portion of the entire organization, and the organization may include other relationships not shown in this visible chart. For example, the person Simone Dugas reports to CFO Craig Dunn, as shown in the visible chart, however he also has a box that reports to Lena Lankerovich, which is not shown on the visible chart. The visible chart 1300 shows seven boxes, seven persons, and seven positions. The reporting relationship is defined by a parent box ID and is stored as a box attribute. The names are field values attached to the "persons" field, and the titles (CFO, Manager, etc.) are field values attached to the "positions" field. Each box in the chart is attached to exactly one person and one position.

Figure 14A:
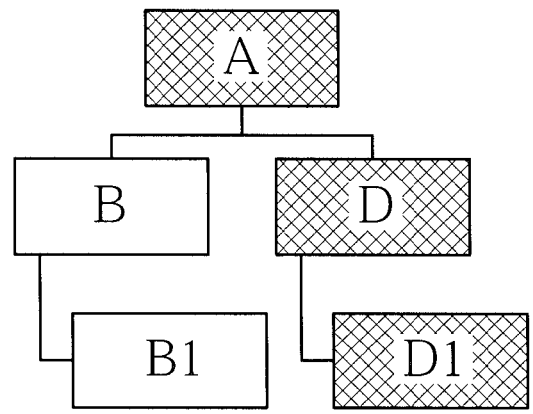
FIG. 14A illustrates a layout of boxes in a chart based on a first hierarchy prior to processing by a data organization process.
Figure 14B:
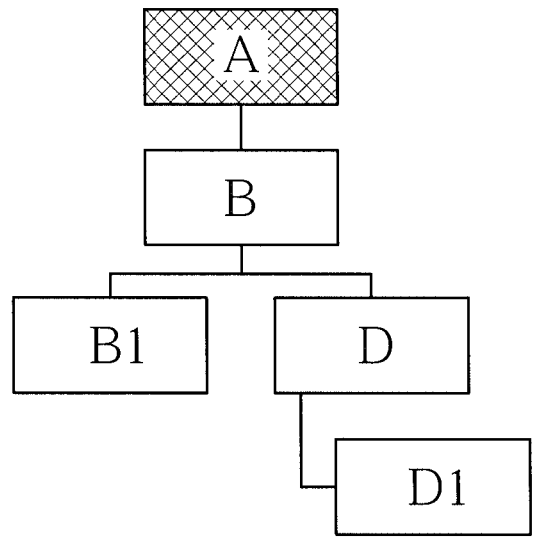
FIG. 14B illustrates the layout of the boxes in a second hierarchy after reorganization for an example embodiment.

The data organization process 214 thus represents an organization as boxes in a hierarchical chart, such as chart 1300. The boxes may include entities such as persons, positions, or assignments and comprise data about the organization's employees and organizational structure (e.g., name, address, position title, salary, performance rating, etc.), or about any arbitrary entities not necessarily having some specific relationship to the organization. The process defines users (e.g., identities which can be granted access to data and functions in the organization), and it defines security configuration (e.g., chart user IDs, roles and role rules). Besides providing access to information relating to specific boxes in a chart, the process can also be used to transform boxes to reorganize the chart. FIG. 14A illustrates a layout of boxes in a chart based on a first hierarchy prior to processing by a data organization process, and FIG. 14B illustrates the layout of the boxes in a second hierarchy after reorganization for an example embodiment. Chart 1400 of FIG. 14A shows the plurality of available boxes for a user whose principal box is B, having access to self and subordinate boxes (box B1 in this case). The computation of the plurality of available boxes and request response starts with a request for data in specific organizational chart using the identity of user B. Based upon the identity of the requesting user and the data of boxes in the organization chart, the process identifies in real time principal boxes (in this case, box B) and the effective set of roles, where the roles are statically granted plus dynamically granted via principal boxes and role rules. Based upon the identified principal boxes and effective set of roles, within the specific organizational chart, the process computes in real time the subset of available boxes and available attributes of those boxes. It then transforms the subset according to the request and returns a response through the GUI. In this example case, B is a principal box with access to itself and subordinates, i.e., B and B1.

For the example of FIG. 14B, it is assumed that the user has requested a change of hierarchy so that user B is superior to user D and his or her subordinates. In this case, a user whose principal box is A or higher changes the hierarchy of FIG. 14A to the state shown in FIG. 14B in real time such as in an interactive drag and drop operation performed through the GUI. FIG. 14B shows the updated plurality of available boxes for the user whose principal box is B, i.e., boxes B, B1, D, and D1. The updated plurality of available boxes for any user and security configuration is in effect immediately upon the next request from any user.

In an embodiment, the data organization process is configured to operate in real time, such that requests are received, processed, and returned in a relatively short amount of time. The system implementation is based upon proprietary algorithms and data structures to hold data in volatile memory (RAM) and execute queries on it. The system also uses a full-text search engine (e.g., Apache Lucene™), which supports incremental modifications. In editing mode, both the internal data structures and the search (Lucene) index can be modified. The index is kept in-sync (also real-time) with each subsequent change because of the need to provide up-to-date full text search results all the time. In an embodiment, the customer data of the organization (master data) is copied in its entirety to a dynamic memory (DRAM) store 234 controlled by the server 204. The process 214 is then executed on the dynamic copy of the organization stored in DRAM 234. This significantly speeds up the processing operations compared to executing the process on data as it is stored in persistent data store 222. Standard caching and memory transfer operations can be used to make the dynamic copy of customer data for processing by the system.

Upon a data request from a user for information regarding specific boxes, the process identifies in real time the user's principal boxes, statically granted roles, the roles granted via principal boxes, and then a plurality of available boxes and their attributes, which can then be transformed and returned in response. Dynamic role assignment is implemented through a change in the security roles, role rules, and/or the chart user ID in the user boxes. This allows a user with a limited scope of information access to assume a different or greater level of information access by simply changing the chart user ID in user properties for specific organizational chart. Alternatively, the role rules and/or security roles can be changed. This allows access grants and hierarchical reorganizations to be implemented without persisting complete access control lists of each and every user in the organization, because access control is re-computed in real time upon each request.

The secure and dynamic control of access to hierarchical organization data provided by the data access process allows use of organization data in conjunction with a variety of other applications that may be used to manipulate this data. For example, the process may be used to perform searches on data based on various fields within the records of the organization chart. Search results can be returned or limited based on the users making the requests, and appropriate reports can be generated based on the access grants to these users. Likewise, the reorganization functions provided through the GUI processes in conjunction with the data access process can be used to perform organization re-modeling, such as for testing various different reorganization scenarios, succession plans, and the like.

It should be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

The illustrated and described method elements are not necessarily strictly independent or unitary method steps. One or more of the illustrated elements (steps) may be combined with one or more of the other elements. Likewise, one or more of the illustrated method elements may be separated into one or more constituent sub-elements or sub-steps. These steps and sub-steps may be performed by the same or different hardware components and software processes, such as those shown in FIG. 2.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of controlling access to information in an organization, in response to a user request for information to a server having access to the information, comprising:

storing organizational data of the organization onto a non-transient computer readable medium that is accessible by the server, wherein the organization data is structured into domains that contain one or more charts each containing boxes representing data entities having a hierarchical relationship to other boxes, wherein each domain represents different subsets of data entities, and each domain includes a chart user ID parameter that defines which field to use to match boxes;

copying original organizational data of the chart to random access memory accessible to the server to generate an optimized data structure representing a current state of that chart;

defining one or more principal boxes per user within a chart to perform rule-based assignment of security roles and to compute structural conditions for data access by the user, wherein a principal box for the user in the chart is identified by a chart user ID value, and wherein the user has a unique chart user ID value for each domain;

statically granting security roles to the user by explicitly configuring a link between a user record and a role within the organization;

defining users identified by authentication credentials through at least one of: the statically granted security role, and user information received from an external source with each request for information;

using one or more role assignment rules to dynamically grant a role to the user upon the user making a request for information through a server executed process, the process including re-computing in real-time by the server, effective data access rights of the requesting user, upon a data access request from the requesting user for one or more boxes in a specific chart; and upon receiving the user request and in real time, executing a server process mapping user records to corresponding principal boxes in the charts of the organizational data using chart user ID values that are defined in user records to determine if a principal box that is responsive to the user request satisfies any role in the effective set of policies, and generating a response containing the principal boxes to which the user is authorized access and omitting principal boxes to which the user is not authorized access, wherein the mapping user records to corresponding principal boxes in the charts includes:

re-computing in real-time by the server, a plurality of available boxes and their respective attributes based on the effective data access rights, upon the data access request; and selecting all boxes from a chart of a domain having a chart user ID parameter value that matches the user's unique chart user ID value for the domain.

2. The method of claim 1 wherein the requests for information include a request by the requesting user to access a requested box within the chart.

3. The method of claim 2 wherein the data access control configuration defines a structural condition that compares the relative hierarchical position of the requested box and the principal boxes within the chart for the purposes of record-level and field-level data access control.

4. The method of claim 2 wherein the data access control configuration defines a box-level condition that defines a Boolean condition to be evaluated against field values and other properties of the requested box for the purposes of record-level and field-level data access control.

5. The method of claim 2 wherein the data access control configuration combines structural conditions and box-level conditions for the purposes of record-level and field-level data access control.

6. The method of claim 1 further comprising, through server-executed processes, receiving and executing requests to re-organize the data in the organization chart constrained by the recomputed current access rights of the requesting user, wherein any resulting change takes immediate effect on data access rights for subsequent requests from any user.

7. The method of claim 1 further comprising, through server-executed processes, receiving and executing requests to change a security configuration constrained by the recomputed current access rights of the requesting user, wherein any resulting change takes immediate effect on data access rights for subsequent requests from any user, and wherein the security configuration is at least one of: users, roles, role assignment rules, chart user IDs for a user, and a field chosen to match a chart user ID value.

8. The method of claim 1 further comprising:
at the server, executing record-level and field-level data access control on one or more requested boxes to determine if the requested boxes as a whole and data in each of the plurality of fields of the requested boxes is allowed to be accessed by the requesting user; and
returning data related to the allowed boxes and allowed fields.

9. The method of claim 8, further comprising assuming values of prohibited fields to be empty for the purposes of searching, filtering and sorting, in order to prevent or reduce an ability of users to estimate prohibited field values using defined operations.

10. The method of claim 1 wherein the entities of the organization comprise one of a person, position, or assignment, and wherein the organizational data comprises personnel data records used in a data management application.

11. The method of claim 1 comprising:
statically assigning roles through the user records; and
dynamically assigning the roles through the principal boxes at runtime through the chart user ID values.

12. The method of claim 1 wherein role rules are assigned to the boxes applied to the principal boxes corresponding to a current user.

13. A system to manage access to information in an organization, comprising:
a non-transient memory component storing data records relating to resources in the organization, the data records being structured into domains that contain one or more charts each containing boxes representing data entities having a hierarchical relationship to other boxes, and having defined one or more principal boxes per user within a chart to perform rule-based assignment of security roles and to compute structural conditions for data access by the user, wherein a principal box for the user in the chart is identified by a chart user ID value, wherein each domain represents different subsets of data entities, and each domain includes a chart user ID parameter that defines which field to use to match boxes, and wherein the user has a unique chart user ID value for each domain;
random access memory accessible to a processor-based server into which original organizational data of the chart is copied to generate an optimized data structure representing a current state of that chart;
a graphical user interface (GUI) component executed by the processor-based server defining and displaying the hierarchical relationship of the resources, wherein each resource is represented as a box in an organization chart of the organization;
a configuration component executed by the processor-based server defining users and other security configurations for the organization by using one or more role assignment rules to dynamically grant a role to the user upon the user making a request for information; and
a data access component running on a server capable of re-computing effective data access rights of the requesting user and a plurality of available boxes and fields in real time in response to a request by a requesting user, by mapping, upon receiving the request, user records to corresponding principal boxes in the charts of the organizational data using chart user ID values that are defined in user records to determine if a principal box that is responsive to the user request satisfies any role in the effective set of policies, and generating a response containing the principal boxes to which the user is authorized access and omitting principal boxes to which the user is not authorized access, wherein the mapping user records to corresponding principal boxes in the charts includes:
re-computing in real-time by the server, effective data access rights of the requesting user, upon a data access request from the requesting user for one or more boxes in a specific chart; and
selecting all boxes from a chart of a domain having a chart user ID parameter value that matches the user's unique chart user ID value for the domain.

14. The system of claim 13 wherein the data records are used in a data management application, and wherein the resources are selected from the group consisting of: people, positions, departments, and organizational entities.

15. The system of claim 14 wherein each data record comprises a plurality of fields, each field of the plurality of fields containing data regarding a specific characteristic of the resource represented by a respective box in the organization chart.

16. The system of claim 15 wherein the request comprises a request to access a requested box within the organization chart, the system further comprising:
a processing component running on a server executing field-level policies on the fields of the requested box to determine if data in each of the plurality of fields is allowed to be accessed by the requesting user; and
a data transfer of the GUI returning data related to one or more fields of the requested box to the requesting user if access to the requested box is allowed, and if access is allowed to the one or more fields.

17. The system of claim 16 wherein the role of each resource is associated with a data access condition specifying a range of boxes hierarchically relative to a user's box that are allowed data access through the user's box, and wherein the range of boxes comprises one of: the box itself only, and a hierarchical level in the organization chart relative to one of the box itself or a supervisor box in the organization chart.

18. The method of claim 1 wherein changing role assignment rules causes dynamic role assignment.

\* \* \* \* \*